United States Patent
Thyni et al.

(10) Patent No.: US 9,781,136 B2
(45) Date of Patent: Oct. 3, 2017

(54) MITIGATING THE IMPACT FROM INTERNET ATTACKS IN A RAN USING INTERNET TRANSPORT

(71) Applicant: Telefonaktiebolaget LM Ericsson (publ), Stockholm (SE)

(72) Inventors: Tomas Thyni, Järfälla (SE); Mats Forsman, Rönninge (SE); Mats Ullerstig, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 177 days.

(21) Appl. No.: 14/427,448

(22) PCT Filed: Feb. 9, 2015

(86) PCT No.: PCT/SE2015/050144
§ 371 (c)(1),
(2) Date: Mar. 11, 2015

(87) PCT Pub. No.: WO2016/130052
PCT Pub. Date: Aug. 18, 2016

(65) Prior Publication Data
US 2016/0373468 A1     Dec. 22, 2016

(51) Int. Cl.
*H04L 29/06* (2006.01)
*H04L 29/08* (2006.01)
(Continued)

(52) U.S. Cl.
CPC ...... *H04L 63/1416* (2013.01); *H04L 63/1425* (2013.01); *H04L 63/1441* (2013.01);
(Continued)

(58) Field of Classification Search
CPC ............. H04L 63/1416; H04L 63/1425; H04L 63/1441; H04L 67/10; H04W 12/12; H04W 84/02
(Continued)

(56) References Cited

U.S. PATENT DOCUMENTS

| 9,397,769 B2 | 7/2016 | Mirbagheri et al. |
| 2006/0276173 A1* | 12/2006 | Srey ...................... H04W 12/08 455/410 |

(Continued)

FOREIGN PATENT DOCUMENTS

| WO | 2008067335 A2 | 6/2008 |
| WO | 2010050983 A1 | 5/2010 |

OTHER PUBLICATIONS

Unknown, Author, "Intrusion detection system", Wikipedia, the free encyclopedia, Available online at: http://wikipedia.org/wiki/Intrusion_detection_system, Oct. 27, 2014, 1-7/.
(Continued)

*Primary Examiner* — Kambiz Zand
*Assistant Examiner* — Aubrey Wyszynski
(74) *Attorney, Agent, or Firm* — Murphy, Bilak & Homiller, PLLC (57) ABSTRACT

The present disclosure relates to methods and devices for mitigating the impact from Internet attacks in a Radio Access Network, RAN (10), using Internet transport. This object is obtained by a method performed in a User Equipment, UE (13) associated with the RAN (10) using Internet transport. The method comprises receiving from at least a network node (11, 12, 21, 22, 23) in the RAN (10), information associated with an Internet attack. Obtaining, based on the information, a mitigation action, the mitigation action mitigating the impact of the attack on the RAN service. The method further comprises to perform the obtained mitigation action to mitigate the impact on the RAN service level.

32 Claims, 5 Drawing Sheets

(51) Int. Cl.
  *H04W 12/12*      (2009.01)
  *H04W 84/02*      (2009.01)
(52) U.S. Cl.
  CPC ............ *H04L 67/10* (2013.01); *H04W 12/12* (2013.01); *H04W 84/02* (2013.01)
(58) Field of Classification Search
  USPC ........................................................ 726/26
  See application file for complete search history.

(56) References Cited

U.S. PATENT DOCUMENTS

| | | |
|---|---|---|
| 2007/0123214 A1 | 5/2007 | Mock |
| 2008/0086776 A1 | 4/2008 | Tuvell et al. |
| 2008/0114885 A1 | 5/2008 | Kulkarni et al. |
| 2008/0295171 A1 | 11/2008 | Singh et al. |
| 2009/0088147 A1 | 4/2009 | Bu et al. |
| 2012/0151033 A1 | 6/2012 | Baliga et al. |
| 2013/0344823 A1 | 12/2013 | Almgren et al. |
| 2015/0180898 A1 | 6/2015 | Liljenstam et al. |

OTHER PUBLICATIONS

Unknown, Author, "Intrusion prevention system", Wikipedia, the free encyclopedia, Available online at: http://en.wikipedia.org/wiki/Intrusion_prevention_system, Oct. 27, 2014, 1-3.
3GPP, Updated version of "Rationale and track of security decisions in Long Term Evolved RAN/3GPP System Architecture Evolution", Nokia et al., 3GPP TSG SA WG3 Security—SA3#45, Draft S3-060840, Dulles, USA, Oct. 31-Nov. 3, 2006, 1-66.

\* cited by examiner

MITIGATING THE IMPACT FROM INTERNET ATTACKS IN A RAN USING INTERNET TRANSPORT

TECHNICAL FIELD

The present disclosure relates to methods, devices and computer programs of mitigating the impact of Internet attacks in a RAN using Internet transport.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE or wireless device, is wirelessly connected to a Radio Base Station, RBS, commonly referred to as a NodeB, NB, in UMTS, and as an evolved NodeB, eNodeB or eNB, in LTE. An RBS is a general term for a radio network node capable of transmitting radio signals to a UE and receiving signals transmitted by a UE.

Traditional transport services e.g. leased lines or Virtual Private Networks, VPNs, are used for transport in the Radio Access Network, RAN. These transport services are very expensive in particular for high bandwidth data services. Internet transport services are much cheaper than traditional transport services. Using Internet for transport services in the RAN will lower the transport cost dramatically. An Internet transport service cost can be a fraction of the cost of a traditional leased lines and VPN services. There is a clear trend in Enterprise networking to use Internet transport services for transport and Mobile Network Operators are starting to put forward this requirement also for the RAN.

Using Internet as transport will expose the connected equipment in the RAN to various attack threats e.g. hackers, viruses, bot-nets, trojans etc. Hackers will search connected devices in the RAN for vulnerability. An attack can start with a port-scan of an IP address on the equipment in the RAN to figure out open ports and then try to connect to the equipment in order to intrude the RAN-equipment.

A counter measurement used in transport networks today are Intrusion Detection System, IDS, and Intrusion Prevention System, IPS.

An IDS is a device or software application that monitors network or system activities for malicious activities or policy violations and produces reports to a management station. There are different types of IDS, but they all are designed to detect suspicious traffic in different ways. An IDS is primarily focused on identifying possible incidents, logging information about them, and reporting attempts.

An IPS can respond to a detected threat by attempting to prevent it from succeeding. IPS use several techniques to counter the attack e.g. dropping packets from attacker, changing the security environment (e.g. reconfiguring a firewall) or making changes in attacker's packet headers. The IPS functionality tries to stop or limit the impact of a network attack by working in-line with the real network traffic, to be able to take actions to actively prevent or block intrusions or denial of services attacks that are detected. These actions are in the form of activating filters to drop/block IP packets, resetting the connection, reassemble fragmented IP packet etc.

One problem when a radio access network and core network is connected to an unsecure network like the Internet is that the IPS has no knowledge of the impact an Internet attack will have on the RAN and the services delivered to the end-users connected to the RAN.

The IPS can take an action to drop traffic from an Internet attacker, but at the same time the usable capacity for e.g. a RBS in the RAN will be limited. This will result in that the RBS in the RAN will still try to serve equal amount of UEs as if the RBS had expected full capacity on the Internet transport services. This will result in very limited end-user performance and Quality of Experience, QoE. It is only when the RBS has so low/limited capacity that the radio signalling can't get through that the RBS will understand that the RBS must be taken out of service. The RBS can't detect that end-user traffic between a S/PGW in the CN and the RBS is dropped due to an Internet attack, even if a significant part of the packets are dropped. The impact will only be seen by the UE as a very limited connection/service.

There is therefore a need for an improved solution for handling Internet attacks in a RAN using Internet transport, which solution solves or at least mitigates at least one of the above mentioned problems.

SUMMARY

An object of the present disclosure is to provide a method, device and computer program to mitigating the impact from Internet attacks in a Radio Access Network, RAN, using Internet transport, which seeks to mitigate, alleviate, or eliminate one or more of the above-identified deficiencies in the art and disadvantages singly or in any combination.

According to aspects, the disclosure presents a method, performed in a in a User Equipment, UE associated with a Radio Access Network, RAN using Internet transport, of mitigating the impact from Internet attacks. The method comprises receiving from at least a network node in the RAN, information associated with an Internet attack. In a next step the UE obtains, based on the information, a mitigation action, the mitigation action mitigating the impact of the attack on the RAN service. Further the UE performs the obtained mitigation action to mitigate the impact on the RAN service level.

According to further aspects, the disclosure relates to a computer program comprising computer program code which, when executed in the UE, causes the UE to execute the method according to above.

According to a yet further aspect, the disclosure presents a method, performed in a network node in a Radio Access Network, RAN, using Internet transport, of mitigating the impact from Internet attacks. The method comprises obtaining intrusion detection information informing the network node that the RAN is under attack. Selecting, based on the intrusion detection information, a mitigation action. The mitigation action comprises sending a message comprising information associated with the Internet attack to the UE connected to the RAN. Further the method comprises performing the selected mitigation action to mitigate the impact on the RAN service level.

According to a further aspect, the disclosure relates to UE, associated with a RAN using Internet transport, of mitigating the impact from Internet attacks. The UE comprises a processor and a memory. The memory contains instructions executable by the processor whereby the UE is operative to.

Receive from a network node in the RAN information associated with an internet attack. Obtain, based on the information, a mitigation action, the mitigation action mitigating the impact of the attack on the RAN service. And perform the obtained mitigation action to mitigate the impact on the RAN service level.

According to further aspects, the disclosure relates to a network node in the RAN, using Internet transport, of mitigating the impact from Internet attacks. The network node comprises a processor and a memory. The memory contains instructions executable by the processor whereby the network node is operative to obtain intrusion detection information informing the network node that the RAN is under attack. The network node is further operative to select, based on the intrusion detection information, a mitigation action. The mitigation action comprises sending a message comprising information associated with the internet attack to the UE connected to the RAN. And to perform the selected mitigation action to mitigate the impact on the RAN service level.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The device, method and computer program disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Figure 1:
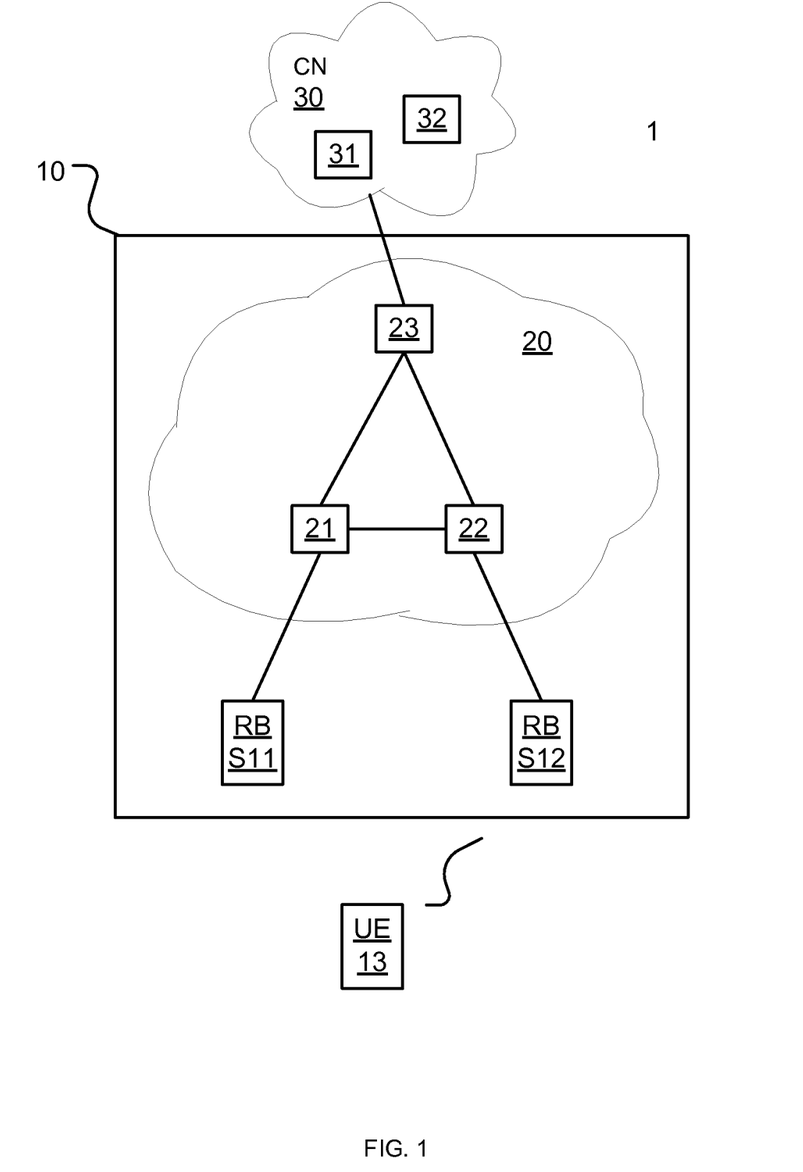
FIG. 1 schematically illustrates a cellular communication network in which exemplary embodiments of the present disclosure can be implemented.

FIG. 1 schematically illustrates an example of a cellular communication network 1 in which aspects of the present disclosure can be implemented. The cellular communication network 1 comprises a radio access network, RAN, 10 and a Core network, CN, 30. Two network nodes 31, 32 are illustrated in the CN 30, but the CN 30 comprises several more network nodes. The RAN 10 comprises a radio access transport network 20. The radio access transport network 20 handles data traffic between e.g. radio base stations 11, 12 and between radio base stations 11, 12 and the CN 30. In this example of the cellular communication network 1 Internet transport services are used in the radio access transport network 20. In this example the radio access transport network 20 comprises several network nodes 21, 22, 23. UEs 13 communicate with the RAN 10.

It is an object of the present disclosure to provide embodiments solving the problem of Internet attacks in the RAN 10 using Internet transport. According to an aspect of the present disclosure the UE 13 receives from a network node 11, 12, 21, 22, 23 in the RAN 10, information associated with an Internet attack. The UE 13 then obtains a mitigation action, based on the information, wherein the mitigation action mitigates the impact of the attack on the RAN service. Thus the impact on the RAN service level can be mitigated by the mitigation performed by the UE 13.

An example of a radio access network 10 is UTRAN, Universal Terrestrial Radio Access Network. The UTRAN is the radio access network 10 in UMTS, Universal Mobile Telecommunications System. Another radio access network 10 is E-UTRAN. The E-UTRAN is the radio access network 10 in an LTE system. The proposed methods could be performed in any node in the RAN 10 or outside the RAN 10 e.g. a cloud implementation.

Figure 2:
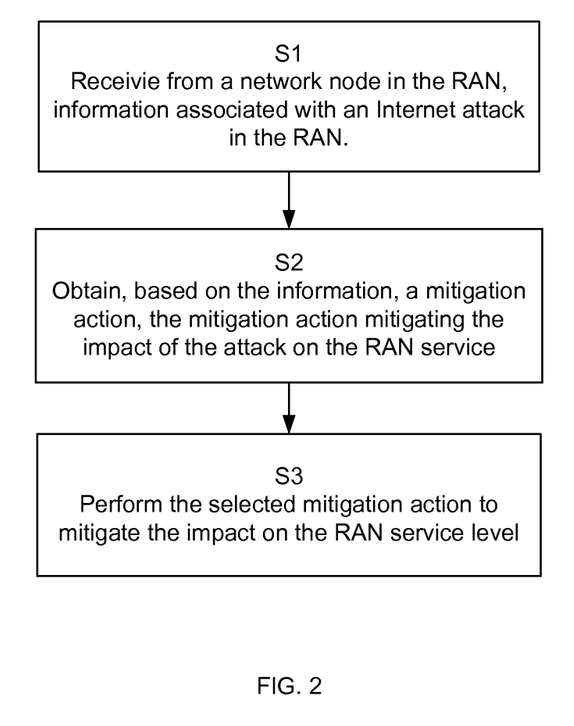
FIG. 2 is a flow chart illustrating the proposed methods performed in the UE.

FIG. 2 illustrates the steps in a method, performed in the UE 13 associated with the RAN 10 using Internet transport, of mitigating the impact from Internet attacks. In a first step S1 the UE 13 receives from at least a network node 11, 12, 21, 22, 23 in the RAN 10, information associated with an Internet attack.

In a next step S2 the UE 13 obtains, based on the information, a mitigation action, the mitigation action mitigating the impact of the attack on the RAN service. The method further comprises, in a next step S3 that the UE 13 performs the obtained mitigation action to mitigate the impact on the RAN service level.

Stated differently in the step S2 the UE obtains, based on the information, the mitigation action that can mitigate the impact of the attack on the RAN service level. According to one aspect of the present disclosure the UE 13 obtains the mitigation action that best can mitigate the impact on the attack on the RAN service level. Thus will the impact on the RAN service level due to the Internet attack be reduced or eliminated when the mitigation action is performed in step S3.

The network node 11, 12, 21, 22, 23 in the RAN can be affected by an Internet attack in different ways. The internet attack can e.g. result in limited Internet transport capacity for the network node 11, 12, 21, 22, 23, processing capacity in the network node 11, 12, 21, 22, 23. The internet attack can also affect the memory and the buffers in the network node 11, 12, 21, 22, 23, so that the network node 11, 12, 21, 22, 23 cannot perform other tasks with the same capacity as when not under an Internet attack.

As mentioned above there are several mitigations actions that the UE 13 can obtain, in step S2, based on the information received in step S1. Some of the mitigations actions will be described below.

One mitigation action that the UE 13 can obtain according to one aspect of the present disclosure is to move the UE 13 to another network node 11, 12, 21, 22, 23.

According to an aspect of the present disclosure the information is received from a first network node 11, 12, 21, 22, 23 in the RAN 10, and the method then further comprises to inform a second network node 11, 12, 21, 22, 23 in the RAN 10 about the attack.

Figure 3:
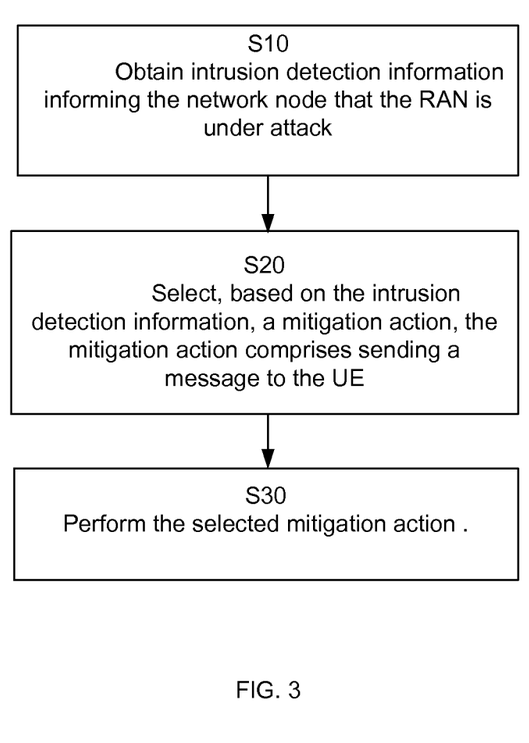
FIG. 3 is a flow chart illustrating the proposed methods performed in a network node in the RAN.

FIG. 3 illustrates the steps in a method, performed in a network node 11, 12, 21, 22 and 23 in a Radio Access Network, RAN, 10 using Internet transport, of mitigating the impact from Internet attacks. In a first step S10 the network node 11, 12, 21, 22 and 23 obtains intrusion detection information informing the network node 11, 12, 21, 22 and 23 that the RAN 10 is under attack. In a next step S20 the network node 11, 12, 21, 22 and 23 selects, based on the intrusion detection information, a mitigation action, wherein the mitigation action comprises sending a message that comprises information associated with the Internet attack to a User Equipment, UE 13 connected to the RAN 10. The method further comprises, in a next step S30 that the network node 11, 12, 21, 22 and 23 performs S30 the selected mitigation action to mitigate the impact on the RAN service level.

In other words in the first step S10 the network node 11, 12, 21, 22 and 23 can receive the intrusion detection information from another network node 11, 12, 21, 22 and 23 or obtain the intrusion detection information from the within the network node 11, 12, 21, 22 and 23.

Stated differently in the step S20 the network node 11, 12, 21, 22 and 23 selects, based on the intrusion detection information, the mitigation action that can inform the UE 13 of the Internet attack. Thus will the impact on the RAN service level due to the Internet attack can be reduced or eliminated when the UE 13 receives the information associated with the Internet attack and performs a mitigation action as descried above.

According to one aspect of the present disclosure the mitigation action comprises instructing the UE 13, being connected to the network node 11, 12, 21, 22, 23 in the RAN 10 to move to another network node 11, 12, 21, 22, 23.

According to yet another aspect of the present disclosure the instructions further comprises timer-value defining the validity time for the mitigation action.

In another exemplary embodiment of the present disclosure the mitigation action further comprises rejecting a connection attempt from the UE 13.

Further according to another aspect of the present disclosure the mitigation action comprises proposing a new network node 11, 12, 21, 22, 23 based on a UE 13 report of Cell availability.

According to one aspect of the present disclosure the network node 11, 12 is a Radio Base Station, RBS. And in another exemplary embodiment of present disclosure the network node 21, 22, 23 is a Base Station Controller, BSC. According to a yet further aspect of the present disclosure the network node 21, 22, 23 is a Radio Network Controller, RNC.

In an exemplary embodiment of the present disclosure the obtaining comprises receiving the intrusion detection information from an IDS. In yet another an exemplary embodiment of the present disclosure the obtaining comprises retrieving the intrusion detection information from within the node since the IDS is located within the network node 11, 12, 21, 22, 23.

Figure 4:
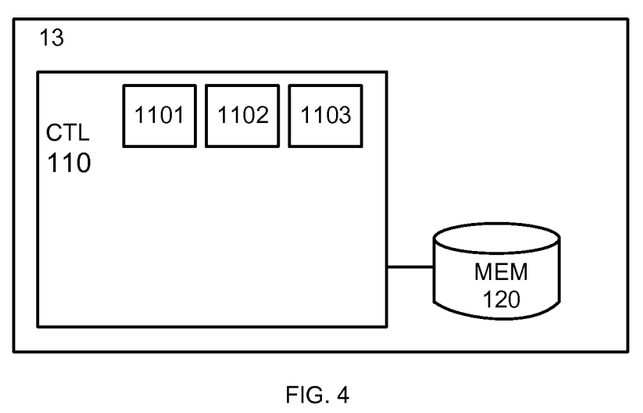
FIG. 4 is a schematic diagram illustrating a UE according to an exemplary embodiment of the present disclosure.

Turning now to FIG. 4, a schematic diagram is disclosed illustrating an exemplary embodiment of the UE 13 associated with the RAN 10 using Internet transport, of mitigating the impact from Internet attacks. The UE 13 comprises a processor 110 and a memory 120, the memory 212 containing instructions executable by the processor 110. The processor 110 is a Central Processing Unit, CPU, microcontroller, Digital Signal Processor, DSP, or any other suitable type of processor capable of executing computer program code. The memory 212 is a Random Access Memory, RAM, a Read Only Memory, ROM, or a persistent storage, e.g. a single or combination of magnetic memory, optical memory, or solid state memory or even remotely mounted memory. According to one aspect, the disclosure further relates to the above mentioned computer program, comprising computer readable code which, when run on the UE 13 causes the UE 13 to perform any of the aspects of the method described above. When the above-mentioned computer program code is run in the processor 110 of the UE 13 it causes the UE 13 receive from a network node 11, 12, 21, 22, 23 in the RAN 10 information associated with an internet attack. The computer program codes further causes the UE 13 to obtaining, based on the information, a mitigation action, the mitigation action mitigating the impact of the attack on the RAN service. Further, the computer program code causes the network node 11, 12, 21, 22, 23 to perform the obtained mitigation action to mitigate the impact on the RAN service level.

According to one aspect, the disclosure further relates to the above mentioned computer program, comprising computer readable code which, when run on the UE 13 causes the UE 13 to perform any of the aspects of the method described above.

According to one aspect of the disclosure the processor 110 comprises one or several of:
- a receiver 1101 adapted receive, from a network node 11, 12, 21, 22, 23 in the RAN 10 information associated with an internet attack;
- obtaining module 1102 adapted to obtain, based on the information, a mitigation action, the mitigation action mitigating the impact of the attack on the RAN service; and
- a performing module 1103 adapted to perform the selected mitigation action to mitigate the impact on the RAN service level.

According to a further aspect the mitigation action comprises moving the UE 13 to another network node 11, 12, 21, 22, 23 in the RAN 10. According to one aspect the UE 13 comprises a performing module 1103 configured for this purpose.

In another aspect of the present disclosure the information is received from a first network node 11, 12, 21, 22, 23 and the UE 13 is further configured to inform a second network node 11, 12 about the Internet attack. According to one aspect the UE 13 comprises a performing module 1103 configured for this purpose.

The receiver module 1101, obtaining module 1102 and performing module 1103 are implemented in hardware or in software or in a combination thereof. The modules 1101, 1102 and 1103 are according to one aspect implemented as a computer program stored in the memory 120 which run on the processing circuitry 110. The UE 13 is further configured to implement all the aspects of the disclosure as described in relation to the methods above.

Figure 5:
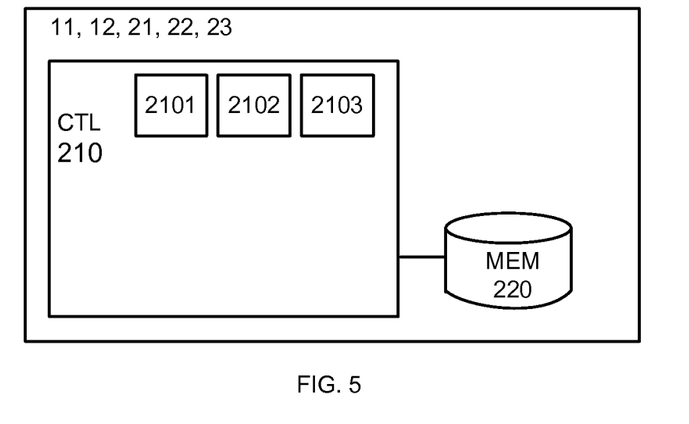
FIG. 5 is a schematic diagram illustrating a network node in the RAN according to an exemplary embodiment of the present disclosure.

Turning now to FIG. 5, a schematic diagram is disclosed illustrating an exemplary embodiment of the network node 11, 12, 21, 22 and 23 in the RAN 10, using Internet transport of mitigating the impact from Internet attacks. The network node 11, 12, 21, 22 and 23 comprises a processor 210 and a memory 220, the memory 210 containing instructions executable by the processor 210. The processor 210 is a Central Processing Unit, CPU, microcontroller, Digital Signal Processor, DSP, or any other suitable type of processor capable of executing computer program code. The memory 210 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the network node 11, 12, 21, 22 and 23 causes the network node 11, 12, 21, 22 and 23 to perform any of the aspects of the method described above.

When the above-mentioned computer program code is run in the processor 210 of the network node 11, 12, 21, 22 and 23 it causes the network node 11, 12, 21, 22 and 23 to obtain intrusion detection information informing the network node 11, 12, 21, 22 and 23 that the RAN 10 is under attack. The computer program codes further causes the network node 11, 12, 21, 22 and 23 to select a mitigation action, wherein the mitigation action comprises sending a message comprising information associated with the internet attack to the UE 13 connected to the RAN 10. Further, the computer program code causes the network node 11, 12, 21, 22 and 23 to perform the selected mitigation action.

According to one aspect, the disclosure further relates to the above mentioned computer program, comprising computer readable code which, when run on the network node 11, 12, 21, 22 and 23, causes the network node 11, 12, 21, 22 and 23 to perform any of the aspects of the method described above.

According to one aspect of the disclosure the processor 110 comprises one or several of:
  a receiving module 2101 adapted receive from the network node 11, 12, 21, 22, 23 in the RAN 10 information associated with an internet attack,
  an obtaining module 2102 adapted to obtaining, based on the information, a mitigation action, the mitigation action mitigating the impact of the attack on the RAN service; and
  a performing module 2103 adapted to perform the obtained mitigation action to mitigate the impact on the RAN service level.

According to an aspect of the present disclosure the mitigation action comprises instructing the UE 13, being connected to the network node 11, 12, 21, 22, 23 to move to another network node 11, 12, 21, 22, 23. According to one aspect the network node 11, 12, 21, 22 and 23 comprises a performing module 2103 configured for this purpose.

In another aspect of the present disclosure the instructions further comprises a timer-value defining the validity time for the mitigation action. According to one aspect the network node 11, 12, 21, 22 and 23 comprises an obtaining module 2102 configured for this purpose.

According to an aspect of the present disclosure the obtained mitigation action comprises rejecting a connection attempt from the UE 13. According to one aspect the network node 11, 12, 21, 22 and 23 comprises an obtaining module 2102 configured for this purpose.

In another exemplary embodiment of the present disclosure the mitigation action further comprising proposing a new network node 11, 12, 21, 22, 23 based on the UE 13 report of Cell availability. According to one aspect the network node 11, 12, 21, 22 and 23 comprises an obtaining module 2102 configured for this purpose.

According to an aspect of the present disclosure the network node 11, 12 is a Radio Base Station, RBS. According to yet another aspect of the present disclosure the network node 21, 22, 23 is a Base Station Controller, BSC. In another aspect according of the present disclosure the network node 21, 22, 23 is a Radio Network Controller, RNC.

According to an aspect of the present disclosure the obtaining comprises receiving the intrusion detection information from an IDS. According to one aspect the network node 11, 12, 21, 22 and 23 comprises an obtaining module 2102 configured for this purpose.

According to yet another an aspect of the present disclosure the obtaining comprises receiving the intrusion detection information from within the network node 11, 12, 21, 22, 23 since the IDS is located within the network node 11, 12, 21, 22, 23. According to one aspect the network node 11, 12, 21, 22 and 23 comprises an obtaining module 2102 configured for this purpose.

The present disclosure is not limited to only attacks from the Internet transport network in the RAN 10. According to aspects of the present disclosure Internet transport is not used in the RAN 10. In these and in embodiments where Internet transport is used attack can also occur from other sources in the RAN 10, CN 30 or UE 13. These attacks can also be mitigated with the methods, devices and computer programs described above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a User Equipment (UE) associated with a Radio Access Network (RAN) using Internet transport, of mitigating impacts from Internet attacks, the method comprising:
  receiving, from a network node in the RAN, information associated with an Internet attack on a network node in the RAN and using Internet transport to provide services to UEs served by the RAN;
  obtaining, based on the information, a mitigation action, the mitigation action mitigating the impact of the attack on a RAN service provided by the RAN; and
  performing the obtained mitigation action to mitigate the impact on a service level for the RAN service.

2. The method of claim 1, wherein the information further comprises at least one suggested mitigation action.

3. The method of claim 1, wherein the mitigation action comprises moving the UE to another network node.

4. The method of claim 1, wherein the information is received from a first network node in the RAN, and wherein the method further comprises informing a second network node in the RAN about the attack.

5. A method, performed in a network node in a Radio Access Network (RAN) and using Internet transport to provide services to user equipments (UEs) served by the RAN, of mitigating impacts from Internet attacks, the method comprising:
 obtaining intrusion detection information informing the network node that the network node is under an Internet attack via an Internet connection to the network node;
 selecting, based on the intrusion detection information, a mitigation action, wherein the mitigation action comprises sending a message comprising information associated with the Internet attack to a User Equipment (UE) connected to the RAN; and
 performing the selected mitigation action to mitigate the impact on a RAN service level.

6. The method of claim 5, wherein the message further comprises at least one suggested mitigation action.

7. The method of claim 5, wherein the mitigation action comprises instructing the UE, being connected to the network node in the RAN, to move to another network node.

8. The method of claim 7, wherein the instructing comprises providing a timer-value defining the validity time for the mitigation action.

9. The method of claim 5, wherein the mitigation action further comprises rejecting a connection attempt from the UE.

10. The method of claim 9, further comprising proposing a new network node based on a UE report of Cell availability.

11. The method of claim 5, wherein the network node is a Radio Base Station (RBS).

12. The method of claim 5, wherein the network node is a Base Station Controller (BSC).

13. The method of claim 5, wherein the network node is a Radio Network Controller (RNC).

14. The method of claim 5, wherein the obtaining comprises receiving the intrusion detection information from an Intrusion Detection System (IDS).

15. The method of claim 14, wherein the IDS is located within the network node.

16. A User Equipment (UE) configured for use with a Radio Access Network (RAN) using Internet transport, the UE comprising a processor and a memory, said memory containing instructions executable by said processor whereby said UE is configured to:
 receive, from a network node in the RAN, information associated with an internet attack on a network node in the RAN and using Internet transport to provide services to UEs served by the RAN;
 obtain, based on the information, a mitigation action, the mitigation action mitigating the impact of the attack on a RAN service provided by the RAN; and
 perform the obtained mitigation action to mitigate the impact on a service level for the RAN service.

17. The UE of claim 16, wherein the information further comprises at least one suggested mitigation action.

18. The UE of claim 16, wherein the mitigation action comprises moving the UE to another network node in the RAN.

19. The UE of claim 16, wherein the information is received from a first network node and wherein the UE is further configured to inform a second network node about the attack.

20. A network node configured for use in a Radio Access Network (RAN) and to use Internet transport to provide services to user equipments (UEs) served by the RAN, the network node comprising a processor and a memory, said memory containing instructions executable by said processor whereby said network node is configured to:
 obtain intrusion detection information informing the network node that the network node is under an Internet attack via an Internet connection to the network node;
 select, based on the intrusion detection information, a mitigation action, wherein the mitigation action comprises sending a message comprising information associated with the internet attack to a User Equipment (UE) connected to the RAN; and
 perform the selected mitigation action to mitigate the impact on a RAN service level.

21. The network node of claim 20, wherein the message further comprises at least one suggested mitigation action.

22. The network node of claim 20, wherein the mitigation action comprises instructing the UE, being connected to the network node, to move to another network node.

23. The network node of claim 22, wherein the instructing comprises providing a timer-value defining the validity time for the mitigation action.

24. The network node of claim 20, wherein the mitigation action comprises rejecting a connection attempt from the UE.

25. The network node of claim 22, further comprising proposing a new network node based on a UE report of Cell availability.

26. The network node of claim 20, wherein the network node is a Radio Base Station (RBS).

27. The network node of claim 20, wherein the network node is a Base Station Controller (BSC).

28. The network node of claim 20, wherein the network node is a Radio Network Controller (RNC).

29. The network node of claim 20, wherein the obtaining comprises receiving the intrusion detection information from an Intrusion Detection System (IDS).

30. The network node of claim 29, wherein the IDS is located within the network node.

31. A non-transitory computer-readable storage medium, having stored thereupon a computer program that, when run in a network node in a Radio Access Network (RAN) and using Internet transport to provide services to user equipments (UEs) served by the RAN, causes the network node to:
 obtain intrusion detection information informing the network node that the network node is under an Internet attack via an Internet connection to the network node;
 select, based on the intrusion detection information, a mitigation action, wherein the mitigation action comprises sending a message comprising information associated with the internet attack to a User Equipment (UE) connected to the RAN; and
 perform the selected mitigation action to mitigate the impact on a RAN service level.

32. A non-transitory computer-readable storage medium, having stored thereupon a computer program that, when run in a user equipment (UE) associated with a Radio Access Network (RAN) using Internet transport, causes the UE to:
 receive, from a network node in the RAN, information associated with an internet attack on a network node in the RAN and using Internet transport to provide services to UEs served by the RAN;
obtain, based on the information, a mitigation action, the mitigation action mitigating the impact of the attack on a RAN service provided by the RAN; and
perform the obtained mitigation action to mitigate the impact on a service level for the RAN service.

* * * * *

UNITED STATES PATENT AND TRADEMARK OFFICE
CERTIFICATE OF CORRECTION

Page 1 of 1

PATENT NO.         : 9,781,136 B2
APPLICATION NO.    : 14/427448
DATED              : October 3, 2017
INVENTOR(S)        : Thyni et al.

It is certified that error appears in the above-identified patent and that said Letters Patent is hereby corrected as shown below:

In the Specification

In Column 6, Line 56, delete "memory 210" and insert -- memory 220 --, therefor.

In Column 6, Lines 60-61, delete "memory 210" and insert -- memory 220 --, therefor.

In Column 7, Line 26, delete "attack," and insert -- attack; --, therefor.

Signed and Sealed this
Twentieth Day of March, 2018

Andrei Iancu
*Director of the United States Patent and Trademark Office*